US010730158B2

(12) United States Patent
Ketelaer (10) Patent No.: US 10,730,158 B2
(45) Date of Patent: Aug. 4, 2020

(54) METHOD AND DEVICE FOR MEASURING A RESONANCE FREQUENCY OF A TOOL SET IN ULTRASONIC VIBRATION FOR MACHINING

(71) Applicant: SAUER GmbH, Stipshausen (DE)

(72) Inventor: Jens Ketelaer, Wiesbaden (DE)

(73) Assignee: SAUER GmbH, Stipshausen (DE)

( * ) Notice: Subject to any disclaimer, the term of this patent is extended or adjusted under 35 U.S.C. 154(b) by 102 days.

(21) Appl. No.: 15/742,400

(22) PCT Filed: Jul. 8, 2016

(86) PCT No.: PCT/EP2016/066331
§ 371 (c)(1),
(2) Date: Jan. 5, 2018

(87) PCT Pub. No.: WO2017/005918
PCT Pub. Date: Jan. 12, 2017

(65) Prior Publication Data
US 2018/0200854 A1 Jul. 19, 2018

(30) Foreign Application Priority Data

Jul. 8, 2015 (DE) .......................... 10 2015 212 809

(51) Int. Cl.
*G01H 13/00* (2006.01)
*B23Q 15/08* (2006.01)
(Continued)

(52) U.S. Cl.
CPC .............. *B23Q 15/08* (2013.01); *B23B 37/00* (2013.01); *B26D 7/086* (2013.01); *G01H 13/00* (2013.01); *B23Q 15/12* (2013.01)

(58) Field of Classification Search
CPC ........ B23Q 15/08; B23Q 15/12; B23B 37/00; G01H 13/00; G01H 1/003; B06B 3/02; B26D 7/086; B23K 20/106
(Continued)

(56) References Cited

U.S. PATENT DOCUMENTS 4,882,525 A * 11/1989 Cordemans De Meulenaer
   et al. ...................... B06B 1/0253
                                    310/316.01
5,959,390 A    9/1999 Boukhny
2007/0251977 A1 * 11/2007 Gnad .................. B06B 1/0246
                                          228/1.1

FOREIGN PATENT DOCUMENTS

DE    102007013055 A1    9/2008
DE    102009027688 A1    7/2010
(Continued)

OTHER PUBLICATIONS

International Search Report for related PCT application PCT/EP2016/066331 dated Sep. 20, 2016. 6 pages.
(Continued)

*Primary Examiner* — Lisa M Caputo
*Assistant Examiner* — Rose M Miller
(74) *Attorney, Agent, or Firm* — Procopio, Cory, Hargreaves & Savitch LLP (57) ABSTRACT

Methods for measuring a resonance frequency of a tool set in ultrasonic vibration during the machining of a workpiece, involving radiating a working signal with a working frequency into a tool holder comprising a tool by a generator to produce the ultrasonic vibration of the tool; after the start of the machining of the workpiece, radiating a test signal with a test frequency varying by the working frequency and a lower power than the working signal power into the tool holder by the generator; generating a sensor signal from the ultrasonic vibration of the tool by a sensor apparatus
(Continued)

arranged in the tool holder; reading out the sensor signal by a read-out apparatus; splitting the sensor signal into a frequency spectrum involving a main frequency and an auxiliary frequency by an analytical apparatus; determining the main frequency from the working frequency and the auxiliary frequency from the resonance frequency.

23 Claims, 6 Drawing Sheets

(51) Int. Cl.
  *B26D 7/08* (2006.01)
  *B23B 37/00* (2006.01)
  *B23Q 15/12* (2006.01)
(58) Field of Classification Search
  USPC .................................................. 73/579, 587
  See application file for complete search history.

(56) References Cited

FOREIGN PATENT DOCUMENTS

| EP | 2353737 A1 | 8/2011 |
| EP | 2803455 A1 | 11/2014 |
| JP | H08243494 A1 | 9/1996 |
| RU | 2131794 C1 * | 6/1999 |
| SU | 935229 A1 | 6/1982 |
| SU | 975338 A1 | 11/1982 |
| WO | 2014184150 A1 | 11/2014 |

OTHER PUBLICATIONS

German Office Action dated Jun. 13, 2016, for corresponding German Patent Application No. 102015212809.1, (German and Partial English Translation), 5 pages.
Partial English translation of SU935229, filed Jun. 15, 1982.
Partial English translation of SU975338, filed Nov. 23, 1982.

* cited by examiner

METHOD AND DEVICE FOR MEASURING A RESONANCE FREQUENCY OF A TOOL SET IN ULTRASONIC VIBRATION FOR MACHINING

CROSS-REFERENCE TO RELATED APPLICATIONS

This application is a U.S. National Stage entry of PCT Application No. PCT/EP2016/066331, filed on Jul. 8, 2016, which claims priority to the corresponding German Patent Application No. 102015212809.1, filed on Jul. 8, 2015, the entire contents of which are hereby incorporated by reference.

The present invention relates to a method for measuring a resonance frequency of a tool set in ultrasonic vibration for machining a workpiece, wherein a working signal having a working frequency is radiated into a tool holder with the tool by a generator in order to produce the ultrasonic vibration of the tool.

BACKGROUND OF THE INVENTION

The prior art discloses machine tools in which, when a workpiece is machined by a tool, the rotary motion of the tool can be superimposed by an ultrasonic vibration of the tool.

EP 1 763 416 B1 describes in this connection a tool including a tool holder which at a first end has a tool holder support for adaptation to a rotary spindle nose and at a second end opposite the first end has a tool support, and including a tool head which can be inserted in the tool support, wherein the tool holder comprises a vibration motor.

In such a machine tool, an ultrasonic transducer in the tool holder, which generates the ultrasonic vibration of the tool, a vibrating body and the tool inserted in the tool holder constitute a vibratory system which is caused to vibrate mechanically by an electrical signal, wherein the greatest possible mechanical vibration amplitude is obtained when the vibratory system is stimulated with its resonance frequency.

In so doing, the problem arises that the resonance frequency can change in the course of a processing operation. There are substantially three reasons for this. On the one hand, the vibratory system or parts thereof can heat up during processing, thus changing the properties of the material. This leads to a temperature drift of the resonance frequency.

On the other hand, the vibration is damped by the processing forces when the tool contacts the workpiece to be processed, wherein in the case of a damped vibration the resonance frequency of the system is lower than the free resonance frequency of the system.

Furthermore, a new, coupled vibration system is formed by coupling the vibration system to the workpiece, the resonance frequency of said vibration system usually being higher than the free resonance frequency. In practice, these three effects occur in combination, and it depends on the specific processing situation which effect dominates.

It should also be noted that in addition to the displacement of the resonance frequency a change in the power also plays a part since due to the interaction between the tool and the workpiece a higher output voltage may be necessary to achieve the same power.

If the free resonance frequency is used for the stimulation and the actual resonance frequency of the system differs therefrom during processing, the vibration of the tool will have a lower amplitude, thus rendering the processing less efficient.

For this reason it is important to detect a change in the resonance frequency of the vibratory system to be able to correspondingly adapt the vibration parameters in such a way that the largest possible vibration amplitude is obtained again.

It is known from ultrasonic welding applications to determine for this purpose both the free resonance frequency and a change in the resonance frequency of the system from initial values of the generator which supplies the electrical signal for the mechanical vibration to the piezo drive in the tool holder. The generator sees that the vibratory system connected via an inductive transmission path has an electrical impedance which depends on the frequency and has a minimum at the mechanical resonance frequency. Accordingly, the generator readjusts its frequency in the case of a shift of the resonance frequency until it reaches the impedance minimum again. In addition to the frequency of the impedance minimum, the impedance value as such also changes due to the processing operation, i.e. a higher output voltage is necessary to drive the same power.

However, this method is not suitable for machining because, unlike with ultrasonic welding, the impedance curves of the employed sonotrodes are much more complex with inserted tools. On the one hand, there are significantly more impedance minima due to the many different vibration modes of the tools with complex forms. On the other hand, the influencing variables which cause a shift of the resonance frequency have a more extreme effect, i.e. the frequency shift can be so large that further impedance minima are skipped. A sonotrode exerts almost the same pressure on the workpiece during the entire welding process. This results in a single frequency shift which is the same in recurring processes and in which the impedance minimum can always be clearly identified. On the contrary, the frequency shift constantly changes during machining on account of varying advancing conditions of the tool into the material and, as described above, the assignment is often no longer possible by means of an impedance measurement alone.

This is because a great many tools with different forms are used, e.g. drills and milling cutters having different dimensions and cutting tools having different cutting geometries, which leads to a higher variance in the shape of the impedance curve compared with ultrasonic welding. Furthermore, the force acting on the vibratory system is generally significantly higher in a machining operation, and therefore the change in the impedance curve is much more marked.

In addition, on account of the recurring processing steps during welding the dominating frequency shift effect can be well predicted, which limits the possible reactions of the system. On the contrary, all effects have to be taken into consideration in a machining operation, and this is why the prediction possibilities and/or the possibilities for limiting the control parameters are insufficient.

Moreover, it is not possible to distinguish bending vibrations or the like from axial vibration modes only on the basis of the impedance measurement. There are also purely electrical resonances which do not produce any vibrations at all. These parasitic effects cannot be detected by the known methods.

A further problem arising when monitoring the vibration on the basis of the generator output is that it is not known which part of the power is actually incorporated into the vibration generation and which part goes into other processes such as the heating of the components involved.

Therefore, it is possible that changes in the vibration are not detected because, although the part of the power which is provided by the generator and is used for the vibration generation is subject to change, the overall power provided by the generator does not change.

SUMMARY OF THE INVENTION

An object of the present invention is therefore to provide a method for measuring a resonance frequency of a tool set in ultrasonic vibration, by means of which the above problems are avoided.

In particular, an object of the present invention is to provide a method by means of which a higher processing accuracy can be achieved in the ultrasonic machining of a workpiece.

Furthermore, an object of the present invention is to provide a device and a machine tool, by means of which the method according to the invention can be carried out.

These objects are achieved by a method according to claim 1, a device according to claim 11 and a device according to claim 19. The dependent claims relate to advantageous embodiments of the method according to the invention and devices according to the invention, respectively.

The method according to the invention for measuring a resonance frequency of a tool set in ultrasonic vibration during the machining of a workpiece comprises the steps of: a) radiating a working signal having a working frequency into a tool holder including the tool by means of a generator in order to produce the ultrasonic vibration of the tool; b) after the start of the machining of the workpiece, radiating a test signal having a test frequency varying by the working frequency and a lower power than a power of the working signal by the generator into the tool holder; c) generating a sensor signal from the ultrasonic vibration of the tool by a sensor apparatus arranged in the tool holder; d) reading-out the sensor signal by a read-out apparatus; e) splitting the sensor signal into a frequency spectrum having a main frequency and an auxiliary frequency by means of an analytical apparatus; f) determining the main frequency from the working frequency and the auxiliary frequency from the resonance frequency.

The sensor apparatus can be designed e.g. as a piezoelectric sensor element or as a strain gage with an electronic circuit. Thus, the resonance frequency of a tool can be determined directly from the mechanical vibration without having to consider for this purpose electric equivalent variables of the generator, which can be inaccurate. In addition, the measurement of the resonance frequency is possible during the ultrasonic processing, such that the determined value of the resonance frequency can be updated at any desired point in time at which the tool vibrates. This is of major advantage in the following situation: Before the tool enters, the resonance frequency of the vibration can be determined by means of the electrical impedance which the generator sees or by means of the phase shift between current and voltage at the outlet of the generator. However, this resonance frequency usually changes when the tool advances into the workpiece. This change can be measured by the method according to the invention.

The advantage of radiating an additional test signal with variable frequency is that a potential shift of the resonance frequency can be determined completely independently from the vibration generation. This means that it is not necessary to change the working frequency to find a shifted resonance frequency, as a result of which the power for the radiation would altogether be reduced. The test frequency can be varied e.g. by means of a sweep method.

The method according to the invention preferably includes the further step: g1) adapting the working frequency to the measured resonance frequency by a first control apparatus for increasing the vibration amplitude of the ultrasonic vibration of the tool.

The method according to the invention preferably includes the further step: h) adapting an output voltage of the generator for stabilizing the power during processing.

In addition to the position of the resonances on the frequency axis, the interaction between tool and workpiece also changes the impedance value on the y-axis of the impedance curve. Therefore, it is advantageous not only to control the working frequency but additionally also to control the output voltage of the generator in such a way that a constant power is achieved during processing.

Therefore, the frequency of the ultrasonic vibration of the tool can be adjusted to the actual resonance frequency in case it differs from the actual resonance frequency so as to increase the processing efficiency. In addition, the mechanical vibration can also be stabilized at the tool tip and fluctuations of the amplitude of the mechanical vibration can be compensated for, which is advantageous for the accuracy of workpiece processing. When the working frequency is adapted without precisely knowing the current resonance frequency there is the danger that the changed working frequency leads to incorrect modes intrinsic vibration of the system, such as torsional or bending vibrations. This problem does not occur in a frequency adaptation which is based on the sensor signal.

The method according to the invention preferably includes the step: g2) increasing the power of the working signal by a second control apparatus on the basis of the height of a peak in the frequency spectrum at the working frequency in order to increase the vibration amplitude of the ultrasonic vibration of the tool.

Therefore, it is possible to infer the mechanical amplitude without using the information on the width of the peak (the so-called quality).

The method according to the invention preferably includes the step: g3) increasing a vibration amplitude of the working signal by a second control apparatus on the basis of a difference between the working frequency and the measured resonance frequency in order to increase the vibration amplitude of the ultrasonic vibration of the tool.

Thus, it is possible to increase and/or stabilize the amplitude of the mechanical vibration without changing the vibration frequency so as to increase the efficiency and accuracy of the processing operation in this manner.

Steps d) to g1), steps d) to g2) or steps d) to g3) are preferably repeated multiple times during the machining of the workpiece while there is a continuous or quasi-continuous radiation of the test signal and a continuous or quasi-continuous radiation of the test frequency, wherein in step g1) the working frequency is automatically adapted to the last measured resonance frequency or in step g2) the power of the working signal is automatically increased on the basis of the last measured height of the peak in the frequency spectrum at the working frequency or in step g3) the vibration amplitude of the working signal is automatically increased on the basis of the last measured resonance frequency.

The advantage is that the resonance frequency does not have to be adapted manually with changing resonance frequency so as to simplify the processing operation for the user.

In step a), the working signal is preferably radiated via a first transmission path and in step d) the sensor signal of the sensor apparatus is transmitted via a second transmission path into the read-out apparatus, wherein the second transmission path is electrically insulated from the first transmission path.

Here, the test signal can also be radiated via the first transmission path, i.e. be superimposed to the working signal, or the test signal can be radiated via a further transmission path electrically insulated from the second transmission path. The advantage is that in each case the sensor signal is not influenced by either the working signal or the test signal, and therefore the detection of the resonance frequency can proceed in parallel to the vibration generation.

Steps b) to f) are preferably repeated while the workpiece is machined in order to continuously monitor the resonance frequency.

Thus, the actual resonance frequency can also only be recorded for certain processing tasks without adapting the working frequency.

The tool is preferably set in rotation before the machining of the workpiece starts.

In particular hard and brittle materials can be well processed with a rotating tool, the rotation of which is superimposed by an ultrasonic vibration.

The method according to the invention preferably includes the further steps: compensating a reactive power flowing between the generator and the tool holder by a compensation circuit; adapting a reactive power compensation on the basis of a difference between the working frequency and the measured resonance frequency.

The compensation circuit can be designed as a parallel circuit, series circuit or combination circuit from one or more capacitances and/or one or more inductances. For example, the compensation circuit can be designed as a capacitance switched parallel to the first transformer. The advantage is that the compensation of the reactive power which is dependent on the complex electrical impedance and thus dependent on the frequency can be adapted by changing the capacitances and/or the inductances.

A reactive power compensation can preferably be adapted by switching a relay.

The advantage is that the values of the capacitances and/or of the inductances can thus be changed in an easy way.

The device according to the invention for measuring a resonance frequency of a tool set in ultrasonic vibration during the machining of a workpiece includes: a tool holder with the tool for machining the workpiece, a generator for radiating a working signal with a working frequency into the tool holder in order to generate the ultrasonic vibration of the tool and for radiating a test signal having a test frequency varying by the working frequency and lower power than a power of the working signal into the tool holder, a sensor apparatus arranged in the tool holder for generating a sensor signal from the ultrasonic vibration of the tool, a read-out apparatus for reading out the sensor signal, an analytical apparatus for splitting the sensor signal into a frequency spectrum having a main frequency and an auxiliary frequency, and an apparatus for determining the main frequency from the working frequency and an auxiliary frequency from the resonance frequency.

The sensor apparatus can be designed e.g. as a piezoelectric sensor element or as a strain gage with an electronic circuit. Here, the main frequency is the frequency at which the frequency spectrum has the maximum peak and the auxiliary frequency is the frequency at which the frequency spectrum has the second highest peak. If the frequency spectrum has only one peak, the main and auxiliary frequencies are at least approximately equal and the vibratory system will already be stimulated close to the resonance frequency. The resonance frequency of a tool can thus be determined directly from the mechanical vibration without electric equivalent quantities of the generator having to be considered. In addition, the measurement of the resonance frequency is possible during ultrasonic processing, such that the determined value of the resonance frequency can be updated at any point in time at which the tool vibrates.

The device preferably has a first control apparatus for adapting the working frequency to the measured resonance frequency in order to increase the vibration amplitude of the ultrasonic vibration of the tool.

Therefore, the frequency of the ultrasonic vibration of the tool can be adjusted to the actual resonance frequency in case it differs from the actual resonance frequency so as to add to the accuracy and the efficiency of the processing operation.

The device preferably has a second control apparatus for increasing the power of the working signal on the basis of a height of a peak in the frequency spectrum at the working frequency or on the basis of a difference between the working frequency and the measured resonance frequency in order to increase the vibration amplitude of the ultrasonic vibration of the tool.

It is thus possible to increase the amplitude of the mechanical vibration without changing the vibration frequency and thus add to the accuracy and processing efficiency.

The device preferably has a user interface connected to the first control apparatus and/or to the second control apparatus for adapting the working frequency or for increasing the power of the working signal by a user of the device.

The advantage is that the user can decide whether, when and under what conditions the working frequency should be changed (e.g. at certain intervals or when a certain deviation of the measured resonance frequency from the working frequency has been reached) or whether the frequency should be controlled automatically. This ensures a high flexibility and needs-based adaptation, e.g. in the case of various modes of processing.

A first transmission path for the contactless transmission of the working signal between the generator and the tool holder is preferably designed as a first transformer and a second transmission path for the contactless transmission of the sensor signal between the tool holder and the read-out apparatus is preferably designed as a second transformer.

Here, the test signal can be superimposed to the working signal and can also be radiated via the first transmission path or the test signal can be radiated via a further transmission path which is electrically insulated from the second transmission path. Both possibilities have the advantage that in any case the sensor signal is not influenced by either the working signal or the test signal and thus the detection of the resonance frequency can proceed in parallel to the vibration generation. The use of transformers has the advantage that the transmission can be carried out in contactless fashion and that no further energy supply is required for the transmission, which is advantageous above all in the case of a rotating tool.

The device preferably has a compensation circuit for compensating a reactive power flowing between the generator and the tool holder.

The compensation circuit can be designed as a parallel circuit, series circuit or combination circuit from one or more capacitances and/or one or more inductances. For example, the compensation circuit can be made as a capacitance switched parallel to the first transformer. The advantage is that the heating of the system can be reduced by the reactive power.

The device preferably has a relay for the adaptation of the compensation of the reactive power flowing between the generator and the tool holder.

The advantage is that the values of the capacitances and/or the inductances of the compensation circuit can easily be changed in this way.

A machine tool according to the invention for machining a workpiece includes the device according to the invention, wherein the machine tool is configured to measure a resonance frequency of a tool set in ultrasonic vibration while machining a workpiece.

A further device according to the invention for outputting output signals and receiving input signals includes: a generator for simultaneously producing a first output signal having a first frequency and a first power and a second output signal having a variable second frequency and a second power, a detection apparatus for detecting an input signal, an analytical apparatus for splitting the input signal into a frequency spectrum with a main frequency and an auxiliary frequency, and a first control apparatus for adapting the first frequency of the first output signal to the auxiliary frequency.

Therefore, outgoing signals and the frequency adaption thereof on the basis of incoming signals can be generated in a compact way in the same device.

The further device according to the invention preferably has a second control apparatus for increasing the first power of the first output signal on the basis of a height of a peak in the frequency spectrum at a main frequency or on the basis of a difference between the main frequency and the auxiliary frequency.

Therefore, it is possible to change a further parameter of the first output signal instead of or in addition to the frequency thereof.

The further device according to the invention preferably has a user interface connected to the first control apparatus and/or to the second control apparatus for adapting the first frequency or for increasing the first power by a user of the apparatus.

The advantage is that the user can decide whether and when the first frequency should be changed or whether the frequency should be controlled automatically.

A machine tool according to the invention for machining a workpiece by a tool set in an ultrasonic vibration has the further device according to the invention, wherein the machine tool is configured to adapt a frequency of the ultrasonic vibration of the tool on the basis of a measured resonance frequency of the tool set in ultrasonic vibration.

DETAILED DESCRIPTION OF THE DRAWINGS AND PREFERRED EMBODIMENTS OF THE PRESENT INVENTION

The present invention is described and explained in detail below by means of embodiments and the exemplary drawings.

Figure 1:
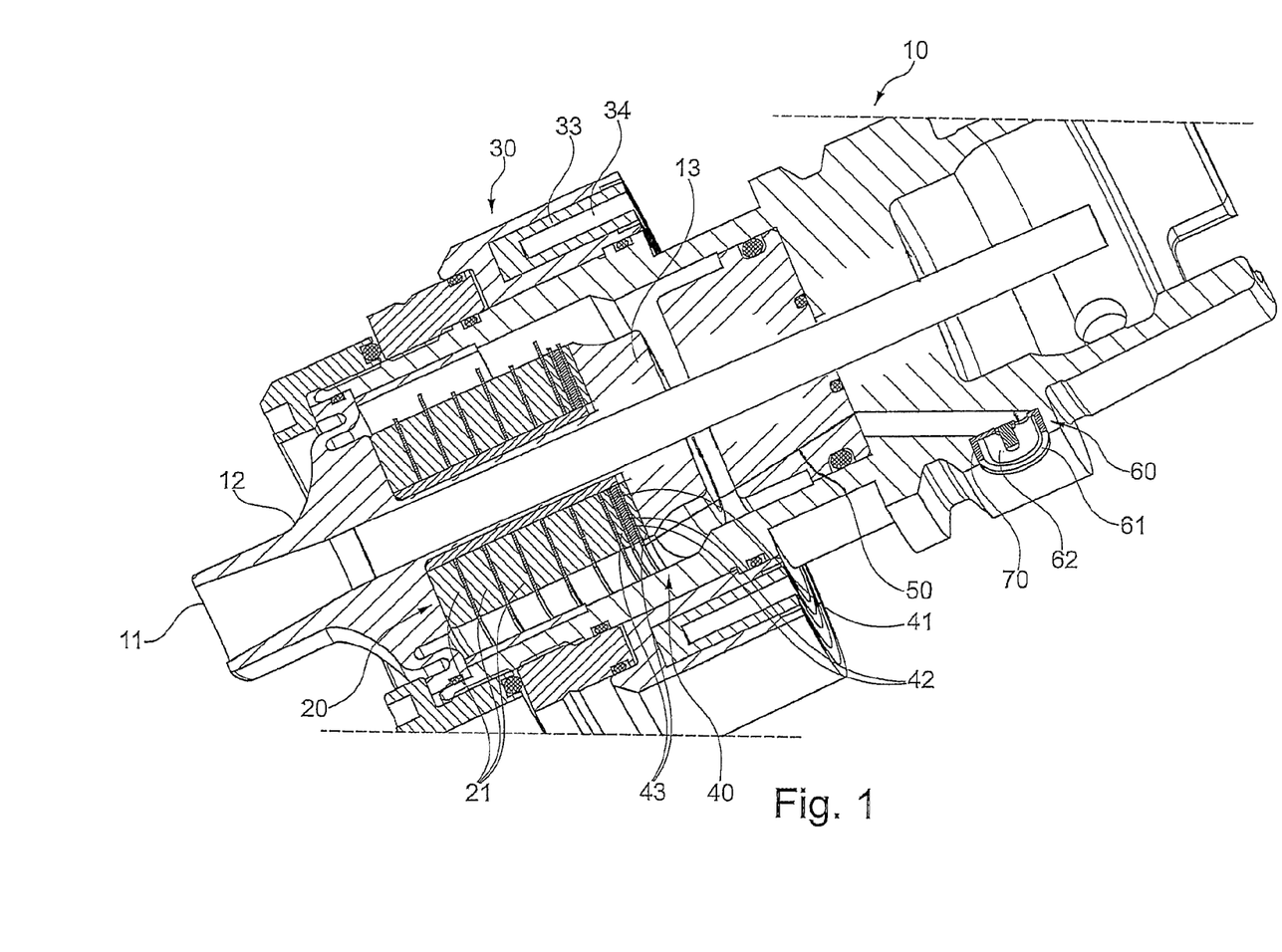
FIG. 1 shows a sectional view of a tool holder which can be used in the method according to the invention.

FIG. 1 shows an exemplary design of a tool holder 10, which can be used in the method according to the invention. A tool support portion 11 for receiving a tool 90 (not shown) is disposed at one end of the tool holder 10. The tool holder 10 accommodates in stacked fashion a plurality, e.g. six, perforated disk-shaped first piezo elements 21, which are connected to the tool support portion 11 via a transmission portion 12 and constitute an ultrasonic transducer 20 for converting an electric voltage into a mechanical vibration. The mechanical vibration of the first piezo elements 21 is transmitted to the tool 90 via the transmission portion 12. The first piezo elements 21 can be designed e.g. as piezo ceramic disks with electrodes mounted between them. The energy is supplied to the ultrasonic transducer 20 via a transformer (first transformer) which, on the machine side, consists of a first pot core 31 and a primary winding 32 (not shown) and, on the tool side, of a second pot core 33 and a secondary coil 34, which are arranged as ring elements on the outer side of the tool holder 10.

On a side of the stack of first piezo elements 21 that faces away from the tool support portion 11, a perforated disk-shaped piezoelectric sensor element 40 is arranged, which is mechanically coupled to the first piezo elements 21 and is electrically insulated from the first piezo elements 21 by an insulation element 43, which can consist of a ceramic perforated disk. The piezoelectric sensor element 40 is electrically insulated by a further insulation element 43 from a fastening element 13, e.g. a fastening nut. The fastening element 13 serves to attach the piezoelectric sensor element 40 to the ultrasonic transducer 20 and the bias of the first piezo elements 21 due to the dynamic load. The first piezo elements 21 and the piezoelectric sensor element 40 have the same orientation, and, on the one hand, this renders possible the generation and the detection of the vibration in the same direction and, on the other hand, results in a space-saving arrangement of the elements in the tool holder 10. The piezoelectric sensor element 40 converts the mechanical vibrations of the vibratory system, which consists of the tool 90, the transmission portion 12, the ultrasonic transducer 20 and the piezoelectric sensor element 40, into a sensor signal S2, which is transmitted as an electric voltage via a wire connection 50 from the piezoelectric sensor element 40 through the tool holder 10 to a transmitter element 60 on the outer side of the tool holder 10. The sensor signal S2 is transmitted from the transmitter element 60 in contactless fashion to a receiver element 80 (not shown) on the machine side. The transmitter element 60 is part of a further transformer (second transformer) and consists of a first ferrite core 61 and a primary winding 62; the receiver element 80 is also part of the second transformer and consists of a second ferrite core 81 and a secondary winding 82. Thus, the sensor signal S2 can be transmitted inductively from the tool holder 10 to a sensor signal evaluation device 110 (not shown) on the machine side. Alternatively, an optical transmission is also possible, wherein the transmitter element 60 is designed as an LED and the receiver element 80 is designed as a photodiode. The transmitter element 60 can be dimensioned and positioned in such a way that is fits into a bore 70 for a data chip for tool data according to the DIN 69893 standard. The tool holder 10 can be rotatable in relation to a stationary part of the machine tool (not shown).

Figure 2:
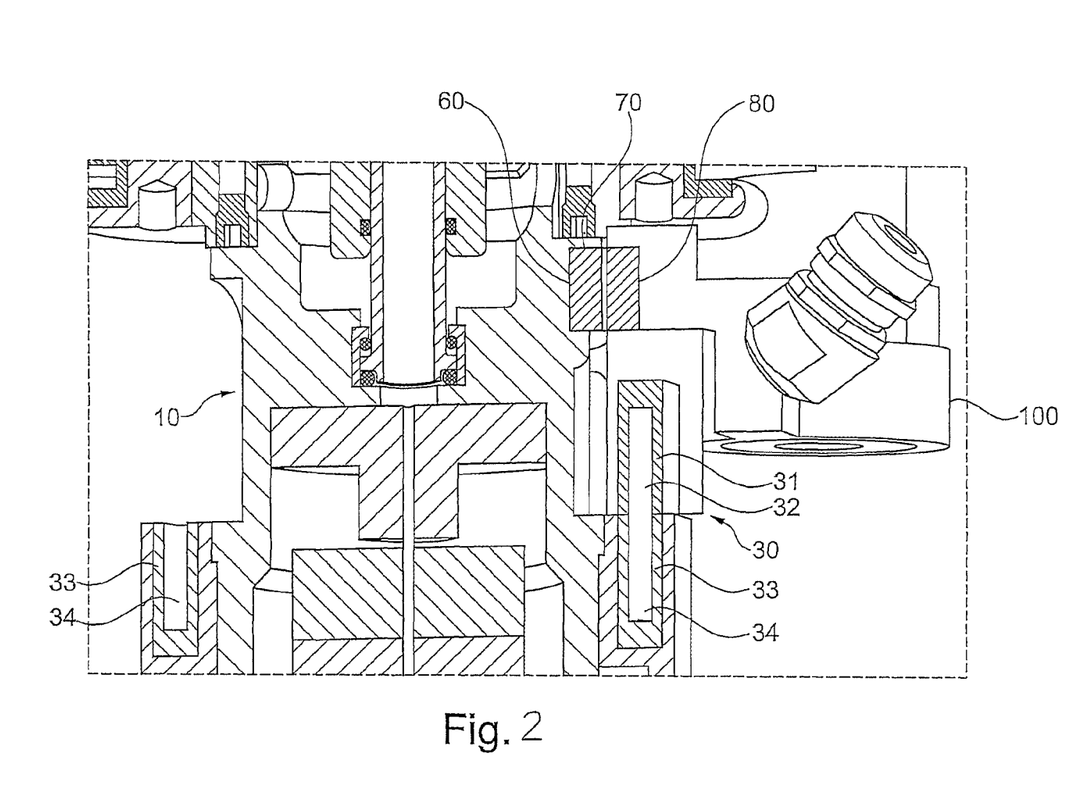
FIG. 2 shows part of a machine tool, by means of which the method according to the invention can be carried out.

FIG. 2 shows, by way of example, a sectional view of an arrangement of the energy transmission device 30 for transmitting the energy for the ultrasonic transducer 20 into the tool holder 10 in the form of a working signal S1 and the arrangement of the transmitter element 60 and of the receiver element 80 for transmitting the sensor signal S2 from the tool holder 10.

The energy transmission device 30 is designed as a transformer (first transformer) having a first pot core 31, a primary winding 32, a second pot core 33 and a secondary winding 34, wherein the openings of the pot cores 31, 33 face each other and the windings 32, 34 are arranged in the respective pot cores 31, 33. The second pot core 33 is here arranged annularly along the tool holder periphery; the first pot core 31 is positioned in a housing 100 on the machine side so as to be spaced apart from the second pot core 33 in an axial direction and is arranged either as a ring segment or as an entire ring around the tool holder 10. The working signal S1 is thus transmitted inductively in an axial direction (in FIG. 2 from top to bottom) from the primary winding 32 to the secondary winding 34.

The housing 100 also accommodates the receiver element 80. The transmitter element 60 is arranged opposite to and at a distance from the receiver element 80 in a bore 70 on the tool holder 10. The sensor signal S2 is thus transmitted in contactless fashion in a radial direction (in FIG. 2 from left to right) from the transmitter element 60 to the receiver element 80. It is also possible to arrange a plurality of transmitter elements 60 circumferentially on the tool holder 10 to reduce signal losses during a rotation of the tool holder 10 when the sensor signal S2 is transmitted. Likewise, a plurality of receiver elements 80 can be arranged opposite the transmitter element 60 or the transmitter elements 60.

During the rotation of the tool holder 10, the second pot core 33 and the secondary winding 34 of the energy transmission device 30 as well as the transmitter element 60 conrotate with the tool holder 10 while the housing 100 with the first pot core 31 and the primary winding 32 of the energy transmission device 30 as well as with the receiver element 80 is mounted e.g. on the tool spindle (not shown) and does not rotate.

In the following, the behavior of the vibratory system during a processing operation is described by means of FIG. 3. The vibratory system which in one embodiment of the invention includes the ultrasonic transducer 20 as a piezo drive, the transmission portion 12, the tool 90 inserted in the tool support portion 11 and the piezoelectric sensor element 40 for generating a sensor signal S2 and the fastening element 13 for the piezoelectric sensor element 40, is stimulated to vibrate mechanically by a working signal S1, which is produced by a generator 120 and is transmitted via the energy transmission device 30 to the ultrasonic transducer 20. The working frequency f1 of the working signal S1 in this case determines the frequency of the mechanical vibration and the power P1 supplied by the generator 120 determines the vibration amplitude. For a given power P1, the vibration amplitude becomes a maximum at the resonance frequency f2 of the vibratory system, wherein the resonance frequency f21 of the free vibration of the system usually differs from the resonance frequency f22 of the system during processing.

Figure 3:
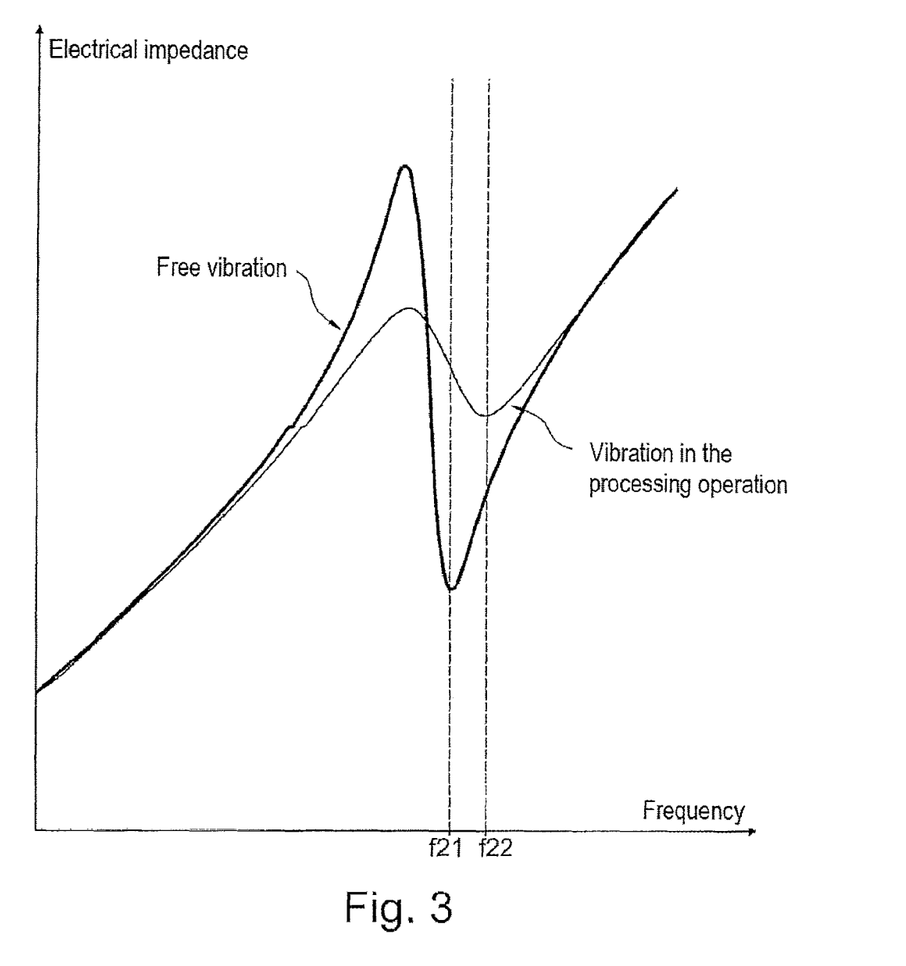
FIG. 3 shows an electrical impedance curve.

FIG. 3 shows electrical impedance curves which the generator 120 sees from the vibratory system connected via the first transformer 31-34 as inductive transmission path. The impedance curve of the free vibration has an impedance maximum (series resonance) at a lower frequency and an impedance minimum (parallel resonance) at a higher frequency. The position of the impedance minimum corresponds with the resonance frequency f21 of the free vibration.

During machining, the generator 120 sees a changed impedance curve with less marked extremes. In addition, the minimum is shifted in relation to the minimum in the free vibration. In FIG. 3, the minimum is shifted towards higher frequencies during processing, i.e. in the illustrated example the resonance frequency f22 during processing is higher than the resonance frequency f21 of the free vibration. However, it is also possible that during processing the resonance frequency f22 becomes smaller than the resonance frequency f21 of the free vibration. Which case will occur and how strongly the resonance frequency will change depends on the influence of the damping by the processing forces, the heating of the system during processing and the resonance behavior of involved coupled vibration systems.

The free resonance frequency f21 can be determined on the basis of initial values of the generator 120, which supplies the working signal S1 for the piezo drive, or by means of the method according to the invention, which is explained in more detail below by means of FIG. 4, before the tool 90 advances into the workpiece and can be used as an estimate for a working frequency f1, by means of which the highest possible vibration amplitude is achieved. The method according to the invention is used to detect a change in the resonance frequency f2 during processing, the value of which can then be used to take the working frequency f1 closer to the actual resonance frequency f2 or to increase the power of the working signal S1 in such a way that the original amplitude is reached again.

Figure 4:
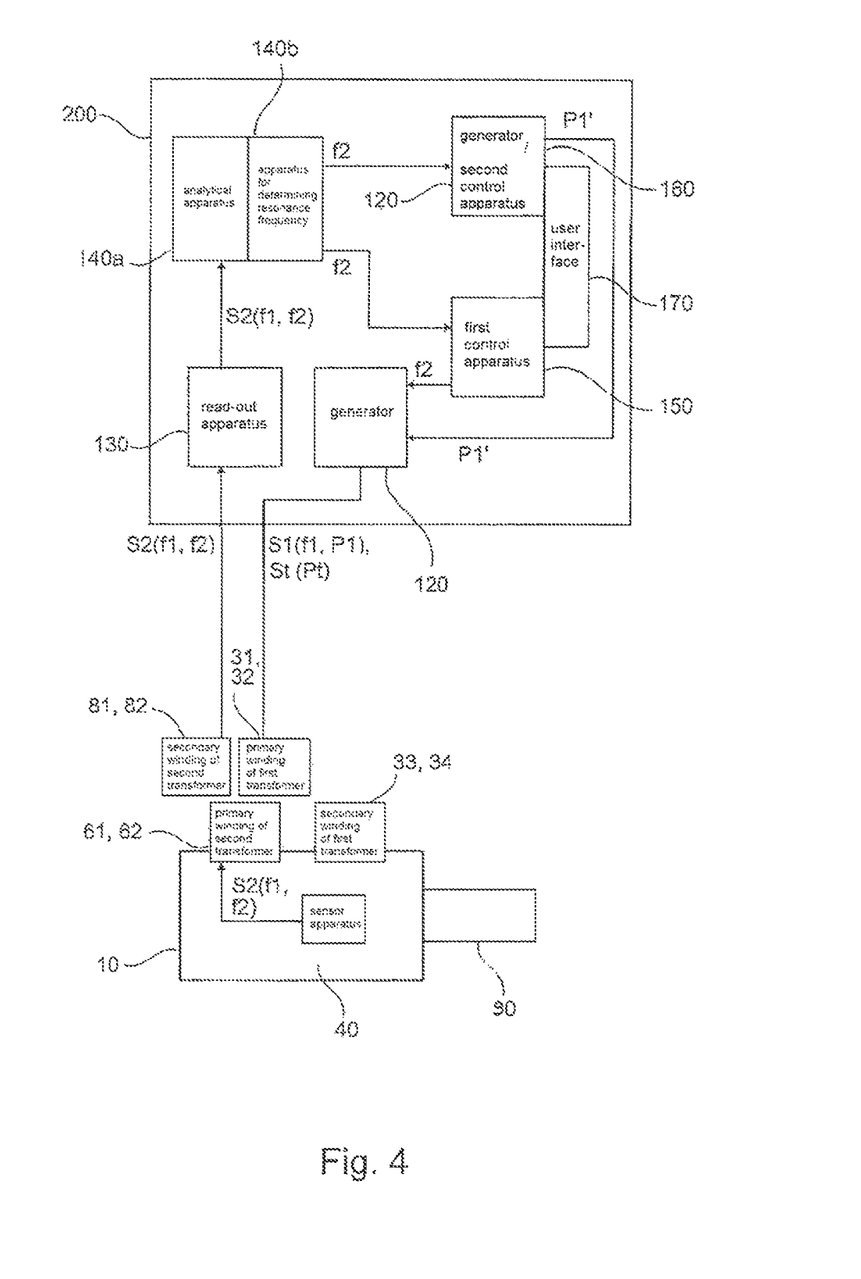
FIG. 4 shows by way of diagram an embodiment of a device according to the invention.

FIG. 4 shows by way of diagram a device according to the invention, by means of which the method according to the invention can be carried out. The device can be part of a machine tool. This figure shows a tool holder 10 having a piezoelectric sensor element 40, the design of which corresponds to the tool holder 10 shown in FIG. 1. A tool 90 for the ultrasonic machining of workpieces is accommodated at the tool holder 10.

A generator 120 emits a working signal S1 as the drive signal for the piezo drive in the tool holder 10. The working signal S1 has the working frequency f1 and is transmitted with the power P1 in contactless fashion into the rotating tool holder 10 via the energy transmission device 30, which is designed as a transformer consisting of primary winding 32 plus first pot core 31 and secondary winding 34 plus second pot core 33. Furthermore, the generator 120 emits a test signal St of a power Pt<P1, which is superimposed to the working signal S1 and the frequency of which varies in a range around f1.

Figure 5:
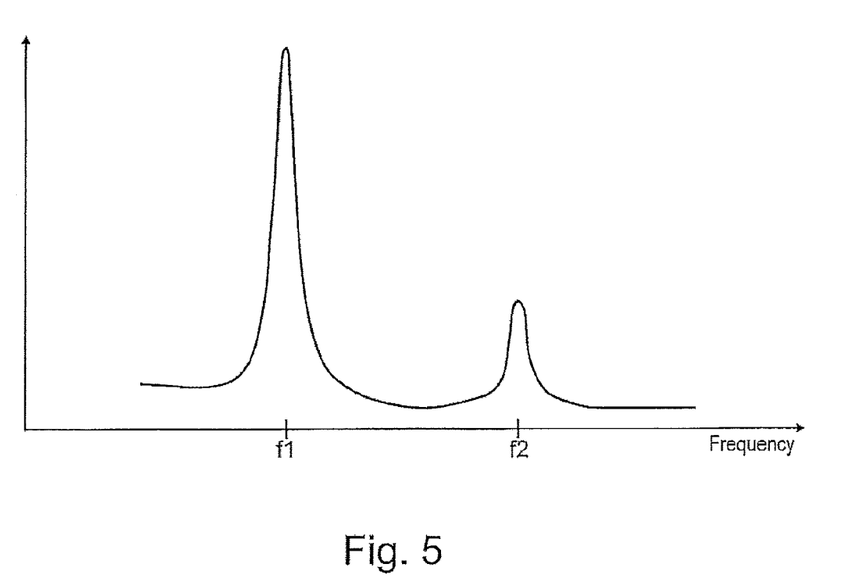
FIG. 5 shows a frequency spectrum.

On account of the signals S1 and St, the vibratory system in the tool holder 10 is stimulated to vibrate, and the frequency spectrum of this vibration substantially has two frequencies. An exemplary frequency spectrum is shown in FIG. 5. The higher peak in the frequency spectrum results from the forced vibration of the system, which is stimulated by the working frequency f1 at a relatively high power P1. The smaller peak results from the forced vibration of the system, which is stimulated at a frequency varying by f1, however, at such a low power Pt that this vibration very rapidly dies away at all frequencies except for the present resonance frequency f2 of the system due to damping.

On account of the vibration of the vibratory system, the piezoelectric sensor element 40 also vibrates in the same way and thus generates an electric sensor signal S2, which contains the information on the frequency spectrum of the vibration. The sensor signal S2 is read out of the rotating tool holder 10 in contactless fashion via a further transformer, which consists of primary winding 62 plus first ferrite core 61 and secondary winding 82 plus second ferrite core 81 by a read-out apparatus 130 and is transmitted to an analytical apparatus 140a. The analytical apparatus 140a determines the frequencies contained in the frequency spectrum of S2, such that in a device for determining the resonance frequency 140b, which can be realized as part of the analytical apparatus 140a, the frequency of the highest peak in the spectrum (main frequency) can be assigned to the working frequency f1 and the frequency of the smaller peak in the spectrum (auxiliary frequency) can be associated with the resonance frequency f2. The read-out apparatus 130, the analytical apparatus 140a and the apparatus for determining the resonance frequency 140b can also be combined into two apparatuses or be realized as a single apparatus.

The value of the determined resonance frequency f2 is transmitted to a first control device 150 which controls the generator 120 in such a way that the frequency f1 of the working signal S1 is adapted to the value of the resonance frequency f2.

Alternatively or additionally, the value of the determined resonance frequency f2 can be transmitted to a second control device 160, which controls the generator 120 in such a way that the power P1, by means of which the working signal S1 is radiated into the tool holder 10, is increased to a power P1' in such a way that the mechanical vibration amplitude which would be achieved as maximum amplitude in the case of a stimulation with the resonance frequency f2 is arrived at even in the case of a stimulation wherein f1≠f2.

In this way, the mechanical vibration amplitude of the tool tip can be stabilized at a certain value, which has a positive effect on the precision when the machining operation is carried out with tool 90. When the vibration amplitude is stabilized at the maximum value possible with a certain power, the efficiency of the workpiece processing is also increased.

A user of the device can control the first control apparatus 150 and/or the second control apparatus 160 via a user interface 170 in such a way that the working signal S1 is only adapted at the command of the user or when a determined condition occurs. The user can also determine that the working signal S1 is automatically adapted at regular or irregular intervals on the basis of the last determined resonance frequency f2.

The generator 120, the read-out apparatus (or detection apparatus) 130, the analytical apparatus 140a and the first control apparatus 150 can be combined into an apparatus 200 for outputting output signals and receiving input signals, wherein a first output signal of this device 200 corresponds to the working signal S1, a second output signal corresponds to the test signal St and an input signal corresponds to the sensor signal S2.

Figure 6:
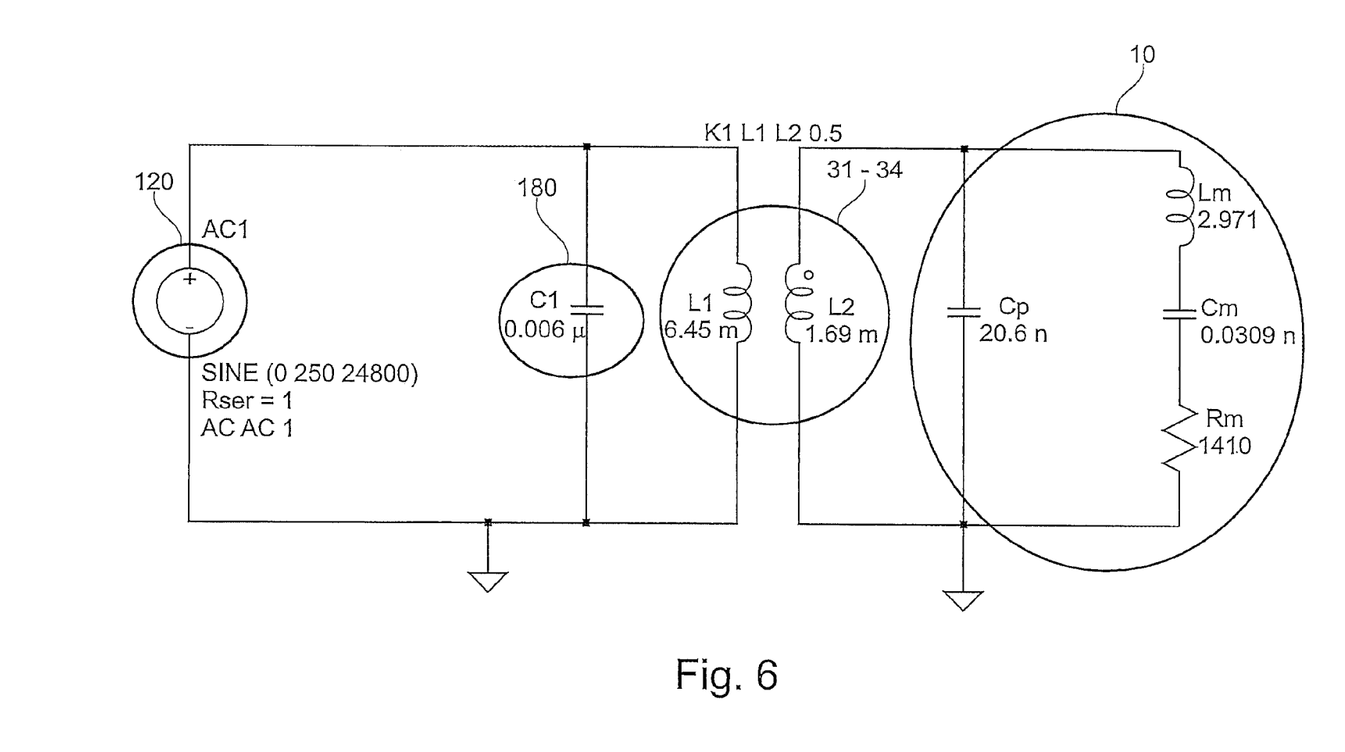
FIG. 6 shows an embodiment of a device according to the invention.

FIG. 6 shows a wiring diagram of the above described components with an exemplary compensation circuit. It shows the replacement wiring diagram of the piezo drive in the tool holder 10, of the first transformer 31-34 with the primary winding 32 on the left and of the secondary winding 34 on the right and the ultrasonic generator 120. A capacitance 180 is switched on the machine side parallel to the transformer 31-34, the value of capacitance can be changed via a relay 190 (not shown).

Depending on the phase shift between voltage and current, reactive power reciprocates between the generator 120 and the tool holder 10 and does not perform any mechanical work but only contributes to heating the system. The reactive power can be compensated for by the capacitance 180. However, since the compensated electrical impedance also has a frequency response, the compensation only functions with a constant value of the capacitance 180 with sufficient accuracy when the changes in the working frequency flare small. With a large change and/or a large deviation of the resonance frequency f2 from the working frequency f1, the value of the capacitance 180 is correspondingly switched by a relay 190.

The compensation circuit can be designed as a parallel circuit, a series circuit or a combination circuit from capacitances and/or inductances and be switched by a relay 190.

The present invention is not limited to the above described embodiments but the individual aspects and or individual features of the above described embodiments can rather be combined to provide further embodiments of the present invention.

LIST OF REFERENCE SIGNS 10 tool holder
11 tool support portion
12 transmission portion
13 fastening element
20 ultrasonic transducer
21 first piezo element
30 energy transmission device
31 first pot core
32 primary winding of the first transformer
33 second pot core
34 secondary winding of the first transformer
40 piezoelectric sensor element as a sensor apparatus
43 insulating element
50 wire connection
60 transmitter element
61 first ferrite core
62 primary winding of the second transformer
70 bore
80 receiver element
81 second ferrite core
82 secondary winding of the second transformer
90 tool
100 housing
110 sensor signal evaluation device
120 generator
130 read-out apparatus/detection apparatus
140a analytical apparatus
140b apparatus for determining the resonance frequency
150 first control apparatus
160 second control apparatus
170 user interface
180 capacitance
190 relay
200 apparatus for outputting output signals and receiving input signals
S1 working signal/first output signal
  f1 working frequency/first frequency
P1, P1' power of the working signal/first power
St test signal/second output signal
Pt power of the test signal/second power
S2 sensor signal/input signal f2 resonance frequency
f21 resonance frequency of the free vibration
f22 resonance frequency during processing

The invention claimed is:

1. A method for determining a resonance frequency of a machining tool set in ultrasonic vibration during machining of a workpiece, comprising:
   a) radiating a working signal with a working frequency into a tool holder comprising the tool, by using a generator to produce the ultrasonic vibration of the tool;
   b) after the start of the machining of the workpiece, radiating a test signal that is superimposed into the working signal, wherein the test signal has a test frequency varying in a range around the working frequency and has a power lower than a power of the working signal, into the tool holder by using the generator;
   c) generating a sensor signal from the ultrasonic vibration of the machining tool using a sensor apparatus arranged in the tool holder;
   d) reading out the sensor signal by a read-out apparatus;
   e) converting the sensor signal into a frequency spectrum comprising a main frequency and an auxiliary frequency by an analytical apparatus;
   f) determining a highest peak in the frequency spectrum as being the main frequency being assigned to the working frequency and determining a smaller peak in the frequency spectrum as being the auxiliary frequency being associated with the resonance frequency.

2. The method according to claim 1, further comprising:
   g1) adapting the working frequency to the determined resonance frequency by a first control device to increase the vibration amplitude of the ultrasonic vibration of the machining tool.

3. The method according to claim 2, further comprising:
   h) adapting an output voltage of the generator in order to stabilize the power during processing.

4. The method according to claim 1, further comprising:
   g2) increasing the power of the working signal by using a second control device on the basis of a height of the peak in the frequency spectrum at the working frequency in order to increase the vibration amplitude of the ultrasonic vibration of the machining tool.

5. The method according to claim 1, further comprising:
   g3) increasing a vibration amplitude of the working signal by using a second control device on the basis of a difference between the working frequency and the determined resonance frequency to increase the vibration amplitude of the ultrasonic vibration of the machining tool.

6. The method according to claim 1, further comprising:
   g) the working frequency is automatically adapted to the last determined resonance frequency, or the power of the working signal is automatically increased on the basis of the last determined height of the peak in the frequency spectrum at the working frequency or the vibration amplitude of the working signal is automatically increased on the basis of the last determined resonance frequency; and
   repeating steps d) to g) multiple times during the machining of the workpiece while there is a continuous or quasi-continuous radiation of the test signal and a continuous or quasi-continuous variation of the test frequency.

7. The method according to claim 1, wherein
   in step a) the working signal is radiated into the tool holder via a first transmission path; and
   in step d) the sensor signal is transmitted from the sensor apparatus via a second transmission path into the read-out apparatus, wherein the second transmission path is electrically insulated from the first transmission path.

8. The method according to claim 1, wherein
   steps b) to f) are repeated during the machining of the workpiece for the continuous monitoring of the resonance frequency.

9. The method according to claim 1, wherein
   the machining tool is set in rotation before the beginning of the machining of the workpiece.

10. The method according to claim 1, further comprising:
    compensating a reactive power flowing between the generator and the tool holder by using a compensation circuit;
    adapting a reactive power compensation on the basis of a difference between the working frequency and the determined resonance frequency.

11. The method according to claim 10, wherein
    the reactive power compensation is adapted by switching a relay.

12. A device for determining a resonance frequency of a machining tool set in ultrasonic vibration during machining of a workpiece, comprising:
    a tool holder with the machining tool configured to conduct the machining of the workpiece,
    a generator configured to radiate a working signal with a working frequency into the tool holder to produce the ultrasonic vibration of the machining tool, and for radiating a test signal that is superimposed to the working signal, wherein the test signal has a test frequency which varies in a range around the working frequency and has a power lower than the power of the working signal into the tool holder,
    a sensor apparatus arranged in the tool holder to produce a sensor signal from the ultrasonic vibration of the machining tool,
    a read-out apparatus configured to read out the sensor signal,
    an analytical apparatus configured to convert the sensor signal into a frequency spectrum comprising a main frequency and an auxiliary frequency, and
    an apparatus configured to determine a highest peak in the frequency spectrum as being the main frequency assigned to the working frequency and determining a smaller peak in the frequency spectrum as being the auxiliary frequency being associated with the resonance frequency.

13. The device according to claim 12, further comprising:
    a first control device configured to adapt the working frequency to the determined resonance frequency to increase the vibration amplitude of the ultrasonic vibration of the tool.

14. The device according to claim 12, further comprising
    a second control device configured to increase the power of the working signal on the basis of a height of the peak in the frequency spectrum at the working frequency or on the basis of a difference between the working frequency and the determined resonance frequency in order to increase the vibration amplitude of the ultrasonic vibration of the machining tool.

15. The device according to claim 14, further comprising
    a user interface, connected to the first control device and/or the second control device, the user interface configured to adapt the working frequency or for increasing the power of the working signal by a user of the device.

16. The device according to claim 12, wherein
a first transmission path is designed as a first transformer for contactless transmission of the working signal between the generator and the tool holder, and
a second transmission path is designed as a second transformer for contactless transmission of the sensor signal between the tool holder and the read-out apparatus.

17. The device according to claim 16, further comprising
a compensation circuit configured to compensate a reactive power flowing between the generator and the tool holder.

18. The device according to claim 17, further comprising
a relay for adapting the compensation of the reactive power flowing between the generator and the tool holder.

19. The device according to claim 12, wherein the device is incorporated into a machine tool configured to conduct machining of a workpiece, wherein
the machine tool is configured to determine a resonance frequency of a machining tool set in ultrasonic vibration during the machining of a workpiece.

20. A device configured to output output signals and receive input signals, the device comprising
a generator configured to simultaneously produce a first output signal with a first frequency and a first power, and a second output signal superimposed to the first output signal with a second frequency varying in a range around the first frequency and a second power lower than the first power,
a detection apparatus configured to detect an input signal,
an analytical apparatus configured to convert the input signal into a frequency spectrum comprising a main frequency and an auxiliary frequency, wherein the analytical apparatus is configured to determine a highest peak in the frequency spectrum as being the main frequency assigned to the first frequency and determine a smaller peak in the frequency spectrum as being the auxiliary frequency being associated with a resonance frequency of a machining tool set in ultrasonic vibration, and
a first control device configured to adapt the first frequency of the first output signal to the auxiliary frequency.

21. The device according to claim 20, further comprising
a second control device configured to increase the first power of the first output signal based on a height of the peak in the frequency spectrum at the main frequency or based on a difference between the main frequency and the auxiliary frequency.

22. The device according to claim 21, further comprising
a user interface, which is connected to the first control device and/or to the second control device, the user interface configured to adapt the first frequency or increase the first power by a user of the apparatus.

23. The device of claim 20, wherein the device is incorporated in the machining tool, the machining tool configured to conduct machining of a workpiece by using a machining tool set in ultrasonic vibration, wherein the machining tool is configured to adapt a frequency of the ultrasonic vibration of the machining tool based on a determined resonance frequency of the machining tool set in ultrasonic vibration.

* * * * *